(12) United States Patent
Saiki et al.

(10) Patent No.: US 11,674,425 B2
(45) Date of Patent: Jun. 13, 2023

(54) REDUCTANT INJECTING DEVICE, EXHAUST GAS PROCESSING DEVICE AND EXHAUST GAS PROCESSING METHOD

(71) Applicant: NGK INSULATORS, LTD., Nagoya (JP)

(72) Inventors: Katsumi Saiki, Nagoya (JP); Yukinari Shibagaki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 3 days.

(21) Appl. No.: 17/220,999

(22) Filed: Apr. 2, 2021

(65) Prior Publication Data

US 2021/0222602 A1 Jul. 22, 2021

Related U.S. Application Data

(63) Continuation of application No. PCT/JP2019/034274, filed on Aug. 30, 2019.

(30) Foreign Application Priority Data

Dec. 4, 2018 (JP) .............................. JP2018-227706

(51) Int. Cl.
*F01N 3/20* (2006.01)
*F01N 3/28* (2006.01)

(52) U.S. Cl.
CPC ......... *F01N 3/2073* (2013.01); *F01N 3/2013* (2013.01); *F01N 3/2828* (2013.01);
(Continued)

(58) Field of Classification Search
CPC . B01D 53/94; F01N 2240/25; F01N 2330/06; F01N 2610/02; F01N 2610/1453;
(Continued)

(56) References Cited

U.S. PATENT DOCUMENTS 9,027,332 B2 * 5/2015 Olivier .................... F01N 11/00
60/303
9,328,640 B2 * 5/2016 Iverson ................... F01N 3/025
(Continued)

FOREIGN PATENT DOCUMENTS

JP 2005-344597 * 12/2005
JP 2005-344597 A1 12/2005
(Continued)

OTHER PUBLICATIONS

English translation of the International Preliminary Report on Patentability (Chapter I) dated Jun. 17, 2021 (Application No. PCT/JP2019/034274).
(Continued)

*Primary Examiner* — Carl C Staubach
*Assistant Examiner* — Diem T Tran
(74) *Attorney, Agent, or Firm* — Burr Patent Law, PLLC

(57) ABSTRACT

A reductant injecting device includes: a honeycomb structure comprising: a pillar shaped honeycomb structure portion having a partition wall that defines a plurality of cells each extending from a fluid inflow end face to a fluid outflow end face; and at least one pair of electrode portions arranged on a side surface of the honeycomb structure portion; an inner cylinder being configured to house the honeycomb structure; a urea sprayer arranged at one end of the inner cylinder; and an outer cylinder arranged on an outer peripheral side of the inner cylinder, the outer cylinder being spaced apart from the inner cylinder. A flow path through which the carrier gas passes is formed between the inner cylinder and the outer cylinder.

11 Claims, 7 Drawing Sheets

(52) U.S. Cl.
CPC ........ *F01N 3/2066* (2013.01); *F01N 2240/25* (2013.01); *F01N 2330/06* (2013.01); *F01N 2610/02* (2013.01); *F01N 2610/1453* (2013.01)

(58) Field of Classification Search
CPC ........ F01N 3/08; F01N 3/2013; F01N 3/2073; F01N 3/2828; F01N 13/009; F01N 13/0093; F01N 2240/40; F01N 2470/08; F01N 2470/24; F01N 2610/06; F01N 2610/102; F01N 3/021; F01N 3/106; F01N 3/2026; F01N 3/2066; Y02T 10/12
See application file for complete search history.

(56) References Cited

U.S. PATENT DOCUMENTS

| | | | | |
|---|---|---|---|---|
| 9,746,175 | B2* | 8/2017 | Tsumagari | ............... F23G 7/066 |
| 2013/0047582 | A1* | 2/2013 | Gonze | .................... F01N 9/002 |
| | | | | 60/274 |
| 2015/0135683 | A1* | 5/2015 | Petry | .................... F01N 3/2006 |
| | | | | 60/286 |
| 2015/0158016 | A1* | 6/2015 | Mori | ................. C04B 35/58092 |
| | | | | 422/174 |
| 2016/0017777 | A1 | 1/2016 | Kasai et al. | |
| 2017/0284256 | A1 | 10/2017 | Ishihara et al. | |
| 2017/0284257 | A1* | 10/2017 | Omiya | ................. B01D 53/944 |
| 2017/0284258 | A1 | 10/2017 | Saiki et al. | |

FOREIGN PATENT DOCUMENTS

| | | |
|---|---|---|
| JP | 2007-327377 A1 | 12/2007 |
| JP | 2017-180298 A1 | 10/2017 |
| JP | 2017-180299 A1 | 10/2017 |
| WO | 2014/148506 A1 | 9/2014 |

OTHER PUBLICATIONS

International Search Report and Written Opinion (Application No. PCT/JP2019/034274) dated Nov. 19, 2019.

* cited by examiner

REDUCTANT INJECTING DEVICE, EXHAUST GAS PROCESSING DEVICE AND EXHAUST GAS PROCESSING METHOD

FIELD OF THE INVENTION

The present invention relates to a reductant injecting device, an exhaust gas processing device, and an exhaust gas processing method.

BACKGROUND OF THE INVENTION

An exhaust gas processing device using a selective catalytic reduction NOx catalyst (SCR catalyst) is known for purifying nitrogen oxides (NOx) in exhaust gases discharged from various engines (Patent Literature 1).

The exhaust gas processing device described in Patent Literature 1 includes a catalyst (SCR catalyst) attached to an exhaust gas pipe of an engine and a means for injecting urea water into the exhaust gas pipe between the engine and the catalyst, and also includes a plurality of urea water injection means for mixing urea water with an exhaust gas, reacting with specific components in the exhaust gas by the catalyst, and mixing the urea water with the exhaust gas.

However, in the exhaust gas processing device described in Patent Literature 1, a temperature of the exhaust gas has to be 200° C. or more in order to decompose urea in the urea water into ammonia by the heat of the exhaust gas. Therefore, when the temperature of the exhaust gas is lower, there is a problem that the decomposition reaction of urea is difficult to take place, and an amount of ammonia required for the NOx treatment is insufficient.

Therefore, an exhaust gas processing device using a reductant injecting device has been proposed, wherein the reductant injecting device includes: a honeycomb structure (a honeycomb heater) having a cylindrical honeycomb structure portion and a pair of electrode portions arranged on a side surface of the honeycomb structure portion; and a urea sprayer being configured to spray an aqueous urea solution onto the honeycomb structure portion (Patent Literature 2). The reductant injecting device used in the exhaust gas processing device can spray the aqueous urea solution onto the honeycomb structure portion that has been electrically heated by applying a voltage to the electrode portions, and decompose the urea in the aqueous urea solution in the honeycomb structure to produce ammonia efficiently.

However, the spraying of the aqueous urea solution onto the honeycomb structure portion electrically heated decreases a temperature of a region where the aqueous urea solution is sprayed, thereby generating a temperature irregularity in the honeycomb structure portion. As a result, urea deposits (crystals caused by the urea) tend to be generated in a lower temperature region of the honeycomb structure portion. The generation of the urea deposits blocks a flow path in the honeycomb structure portion, which will inhibit the decomposition of the urea into ammonia.

Therefore, exhaust gas processing devices using a reductant injecting device provided with a carrier gas introduction port between the urea injector and the honeycomb structure have been proposed (Patent Literatures 3 and 4). According to the reductant injecting device used in each exhaust gas processing device, a carrier gas introduced from the carrier gas introduction port can facilitate the flow of the gas in the honeycomb structure portion. Therefore, even if the aqueous urea solution is sprayed onto the honeycomb structure portion, a temperature difference in the honeycomb structure portion can be decreased, thereby suppressing the generation of urea deposits.

CITATION LIST

Patent Literatures

[Patent Literature 1] Japanese Patent Application Publication No. 2007-327377 A
[Patent Literature 2] WO 2014/148506
[Patent Literature 3] Japanese Patent Application Publication No. 2017-180298 A
[Patent Literature 4] Japanese Patent Application Publication No. 2017-180299 A

SUMMARY OF THE INVENTION

The present invention relates to a reductant injecting device, comprising:
a honeycomb structure comprising:
a pillar shaped honeycomb structure portion having a partition wall that defines a plurality of cells each extending from a fluid inflow end face to a fluid outflow end face; and
at least one pair of electrode portions being configured to heat the honeycomb structure portion by conducting a current, the pair of the electrode portions being arranged on a side surface of the honeycomb structure portion, the honeycomb structure being configured to be able to decompose urea in an aqueous urea solution in the honeycomb structure portion heated by conducting the current to generate ammonia;
an inner cylinder being configured to house the honeycomb structure, the inner cylinder having a carrier gas introduction port being configured to introduce a carrier gas, on the fluid inflow end face side;
a urea sprayer being configured to spray the aqueous urea solution to the fluid inflow end face side of the honeycomb structure portion, the urea sprayer being arranged at one end of the inner cylinder; and
an outer cylinder arranged on an outer peripheral side of the inner cylinder, the outer cylinder being spaced apart from the inner cylinder and having a carrier gas inflow port being configured to allow the carried gas to flow in from the fluid outflow end face side of the honeycomb structure portion,
wherein a flow path through which the carrier gas passes is formed between the inner cylinder and the outer cylinder, and the reductant injecting device is configured such that the carrier gas through which the flow path passes can be heated by heat exchange with the honeycomb structure portion heated by conducing the current.

Further, the present invention relates to an exhaust gas processing device, comprising:
an exhaust gas pipe through which an exhaust gas flows;
the reductant injecting device being configured to inject ammonia into the exhaust gas pipe; and
an SCR catalyst arranged at the exhaust cylinder on a downstream side of a position where the ammonia is injected.

Furthermore, the present invention relates to a method for processing an exhaust gas, the method comprising injecting generated ammonia into the exhaust gas by the reductant injecting device, and reducing the exhaust gas mixed with the ammonia by an SCR catalyst.

DETAILED DESCRIPTION OF THE INVENTION

Figure 1:
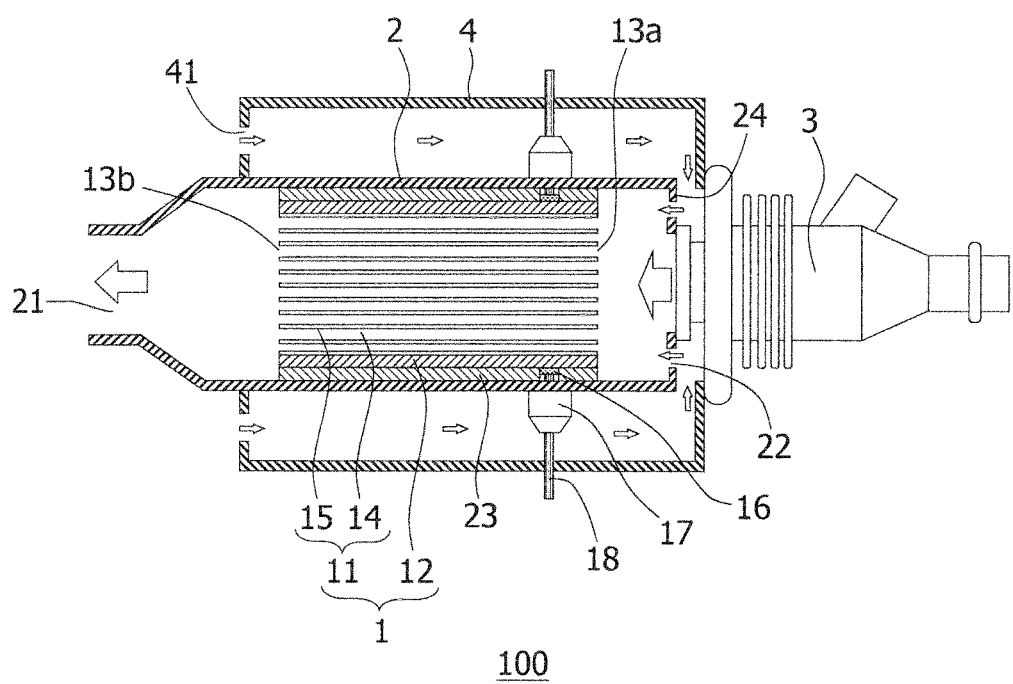
FIG. 1 is a schematic cross-sectional view showing a reductant injecting device according to Embodiment 1 of the present invention.

An amount of NOx in an exhaust gas is changed depending on driving patterns of motor vehicles. When the amount of NOx in the exhaust gas is higher, an amount of ammonia required for purifying NOx is increased, so that an amount of the aqueous urea solution sprayed is needed to be increased. The increased amount of the aqueous urea solution sprayed decreases a temperature of the honeycomb structure, so that an electric power for conducting a current is required to be increased.

However, in the conventional reductant injecting devices as described in Patent Literatures 2 to 4, an increased electric power for current conduction results in a large temperature distribution in the honeycomb structure portion, so that the honeycomb structure portion may be damaged.

Further, in the conventional reductant injecting devices as described in Patent Literatures 3 and 4, urea deposits tend to be difficult to occur when the temperature of the carrier gas is higher, but in order to increase the temperature of the carrier gas, a heating means has to be separately provided.

The present invention has been made to solve the above problems. An object of the present invention is to provide a reductant injecting device, which can suppress urea deposits and prevent the honeycomb structure from being damaged even if the electric power for current conduction is increased.

Also, a further object of the present invention is to provide an exhaust gas processing device and an exhaust gas processing method, which can inject a required amount of ammonia from the reductant injecting device to purify NOx, even if an amount of NOx in the exhaust gas is higher.

As a result of intensive studies for a structure of a reductant injecting device including a honeycomb structure in which at least one pair of electrode portions are arranged on a side surface of a honeycomb structure portion, the present inventors have focused on the fact that a temperature of the interior of the honeycomb structure when the electric power for current conduction is increased is locally higher around the electrode portions (an outer peripheral region of the honeycomb structure), and they have found that the outer peripheral region of the honeycomb structure is provided with a flow path and the heat of the outer peripheral region of the honeycomb structure is exchanged with a carrier gas, whereby the temperature of the carrier gas can be increased while decreasing the temperature of the outer peripheral region of the honeycomb structure to reduce the temperature distribution in the honeycomb structure. Based on the findings, they have completed the present invention.

According to the present invention, it is possible to provide a reductant injecting device, which can suppress urea deposits and prevent the honeycomb structure from being damaged even if the electric power for current conduction is increased.

Also, according to the present invention, it is possible to provide an exhaust gas processing device and an exhaust gas processing method, which can inject a required amount of ammonia from the reductant injecting device to purify the NOx, even if an amount of NOx in an exhaust gas is increased.

Hereinafter, preferable embodiments of a reductant injecting device, an exhaust gas processing device and a method for processing an exhaust gas according to the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention. For example, some components may be deleted from all components set forth in the embodiments, or components of different embodiments may be combined as appropriate.

Embodiment 1

(1) Reductant Injecting Device

FIG. 1 is a schematic cross-sectional view showing a reductant injecting device according to Embodiment 1 of the present invention (a schematic cross-sectional view parallel to an extending direction of cells of a honeycomb structure portion).

As shown in FIG. 1, a reductant injecting device 100 according to the present embodiment includes: a honeycomb structure 1; an inner cylinder 2 being configured to house the honeycomb structure 1; a urea sprayer 3 arranged at one end of the inner cylinder 2; and an outer cylinder 3 arranged on an outer peripheral side of the inner cylinder 2, spaced apart from the inner cylinder 2.

The honeycomb structure 1 includes: a pillar shaped honeycomb structure portion 11 having a partition wall 15 that defines a plurality of cells 14 extending from a fluid inflow end face 13a to a fluid outflow end face 13b; and at least one pair of electrode portions 12 being configured to heat the honeycomb structure portion 11 by conducting a current, the electrode portions 12 being arranged on a side surface of the honeycomb structure portion 11. The cells 14 of the honeycomb structure portion 11 form a flow path.

As used herein, the "fluid inflow end face 13a" means an end face having a fluid inflow port, and the "fluid outflow end face 13b" means an end face having a fluid outflow port. Further, as used herein, the "pair of electrode portions 12" means that one electrode portion 12 is arranged on an opposite side of the other electrode portion 12 across the center of the honeycomb structure portion 11, in a cross section orthogonal to the extending direction of the cells 14 of the honeycomb structure portion 11.

The electrode portion 12 is formed in a band shape along the extending direction of the cells 14. One pair of electrode portions 12 are preferred, but pairs of electrode portions 12 are possible in terms of increasing a heat generation efficiency of the honeycomb structure portion 11.

The inner cylinder 2 has an inlet side end portion and an outlet side end portion. The inlet side end portion, which is one end, is provided with the urea sprayer 3, and the outlet side end, which is the other end, is provided with an injection port 21 for injecting ammonia. Further, the inner cylinder 2 has a carrier gas introduction port 22 being configured to introduce a carrier gas on the fluid inflow end face 13a side of the honeycomb structure portion 11, i.e., between the honeycomb structure 1 and the urea sprayer 3. Non-limiting examples of the carrier gas that can be used include exhaust gases, intake gases, and air from other air feeding devices (compressors and the like mounted on large vehicles and the like).

The honeycomb structure 1 housed in the inner cylinder 2 is fixed (held) in the inner cylinder 2 via an insulation holding portion 23. This can allow insulation between the honeycomb structure 1 and the outer cylinder 2 to be ensured. There may be a portion (space) where the insulation holding portion 23 is not arranged between the honeycomb structure 1 and the inner cylinder 2, but the entire outer circumference of the honeycomb structure 1 may be covered with the insulation holding portion 23 in order to increase a heat exchange efficiency with the carrier gas flowing over the outer circumference of the inner cylinder 2. A material of the insulation holding portion 23 is not particularly limited as long as it has excellent insulating properties and thermal conductivity, but alumina is preferable.

The urea sprayer 3 is arranged at one end (inlet side end portion) of the inner cylinder 2 and sprays an aqueous urea solution on the fluid inflow end face 13a side of the honeycomb structure portion 11. The aqueous urea solution is a raw material for ammonia produced by the reductant injecting device 100 according to the present embodiment.

The outer cylinder 4 has an inlet side end portion on the fluid outflow end face 13b side of the honeycomb structure portion 11, and an outlet side end portion on the fluid inflow end face 13a side of the honeycomb structure portion 11. The inlet side end portion is provided with a carrier gas inflow port 41 being configured to allow the carrier gas to flow in from the fluid outflow end face 13b side of the honeycomb structure portion 11, and the outlet side end portion is provided with the urea sprayer 3. Further, the outer cylinder 4 has the inner cylinder 2 inserted inside, and is arranged on the outer peripheral side of the inner cylinder 2, spaced apart from the inner cylinder 2. A flow path through which the carrier gas flows is formed between the inner cylinder 2 and the outer cylinder 4.

In the reductant injecting device 100 according to the present embodiment, which has the above structure, urea in the aqueous urea solution sprayed from the urea sprayer 3 is decomposed in the honeycomb structure portion 11 heated by conducting the current to generate ammonia (a reductant), and the ammonia is injected to the outside via the injection port 21. In this case, the introduction of the carrier gas into the fluid inflow end surface 13a side of the honeycomb structure portion 11 can create the flow of the gas from the fluid inflow end face 13a to the fluid outflow end face 13b side in the honeycomb structure portion 11. This prevents the heat and the aqueous urea solution from being stagnated in the honeycomb structure portion 11, thereby suppressing urea deposits.

Further, the carrier gas is fed from the carrier gas inflow port 41, and is heated by exchanging the heat with the honeycomb structure portion 11 heated by current conduction while flowing through the flow path between the inner cylinder 2 and the outer cylinder 4. Therefore, the carrier gas can be previously heated by heat exchange and introduced into the honeycomb structure portion 11, so that the effect of suppressing the urea deposits can be further inexpensively and easily improved.

Further, when the electric power for current conduction is increased, a temperature of the outer peripheral region of the honeycomb structure portion 11 tends to be locally higher, but the temperature of the outer peripheral region of the honeycomb structure portion 11 can be lowered by heat exchange with the carrier gas. Therefore, the temperature distribution can be reduced while increasing the temperature inside the honeycomb structure portion 11, so that any damage to the honeycomb structure portion 11 can be prevented and an amount of ammonia sprayed can be increased.

Hereinafter, the reductant injecting device 100 according to the present embodiment will be described in detail for each component.

(1-1) Honeycomb Structure 1

The honeycomb structure 1 includes the honeycomb structure portion 11 and the electrode portions 12.

The partition wall 15 forming the honeycomb structure portion 11 may preferably be made of ceramics, although not particularly limited thereto. In particular, the partition wall 15 preferably contains a silicon-silicon carbide composite material or silicon carbide as a main component, and more preferably a silicon-silicon carbide composite material as a main component. The use of such a material can allow electrical resistivity of the honeycomb structure portion 11 to be easily adjusted to any value by changing a ratio of silicon carbide and silicon.

As used herein, the "silicon-silicon carbide composite material" as the main component means a material containing silicon carbide particles as an aggregate and metallic silicon as a binding material for binding silicon carbide particles. In the silicon-silicon carbide composite material, it is preferable that a plurality of silicon carbide particles are bonded by metallic silicon. Further, the "silicon carbide" as the main component means a material formed by sintering silicon carbide particles. Furthermore, as used herein, the "main component" means a component contained in an amount of 90% by mass or more.

The honeycomb structure portion 11 preferably has an electrical resistivity of from 0.01 to 500 Ωcm, and more preferably from 0.1 to 200 Ωcm, although not particularly limited thereto. The control of the electrical resistivity to such a level can effectively heating the honeycomb structure portion 11 by applying a voltage to at least one pair of electrode portions 12. More particularly, in order to heat the honeycomb structure portion 11 to 160 to 600° C. using a power source having a voltage of from 12 to 200 V, the electrical resistivity is preferably in the above range.

The electrical resistivity of the honeycomb structure portion 11 is a value at 25° C. The electrical resistivity of the honeycomb structure portion 11 is a value measured by a four-terminal method.

The honeycomb structure portion 11 preferably has a surface area per unit volume of from 5 $cm^2/cm^3$ or more, and more preferably from 8 to 45 $cm^2/cm^3$, and particularly preferably from 20 to 40 $cm^2/cm^3$. The surface area of 5 $cm^2/cm^3$ or more can allow a sufficient contact area with the aqueous urea solution to be ensure, thereby appropriately controlling a treatment rate of the aqueous urea solution, i.e., an amount of ammonia generated (a generation rate).

The surface area of the honeycomb structure portion 11 is an area of the surfaces of the partition wall 15 of the honeycomb structure portion 11.

The partition wall 15 of the honeycomb structure portion 11 preferably has a thickness of from 0.06 to 1.5 mm, and more preferably from 0.10 to 0.80 mm. The thickness of the partition wall 15 of 1.5 mm or less can reduce a pressure loss, thereby appropriately controlling the treatment rate of the aqueous urea solution, i.e., the amount of ammonia generated (generation rate). The thickness of the partition wall 15 of 0.06 mm or more can prevent the honeycomb structure portion 11 from being destroyed by a thermal shock caused by electric conduction heating.

Figure 2:
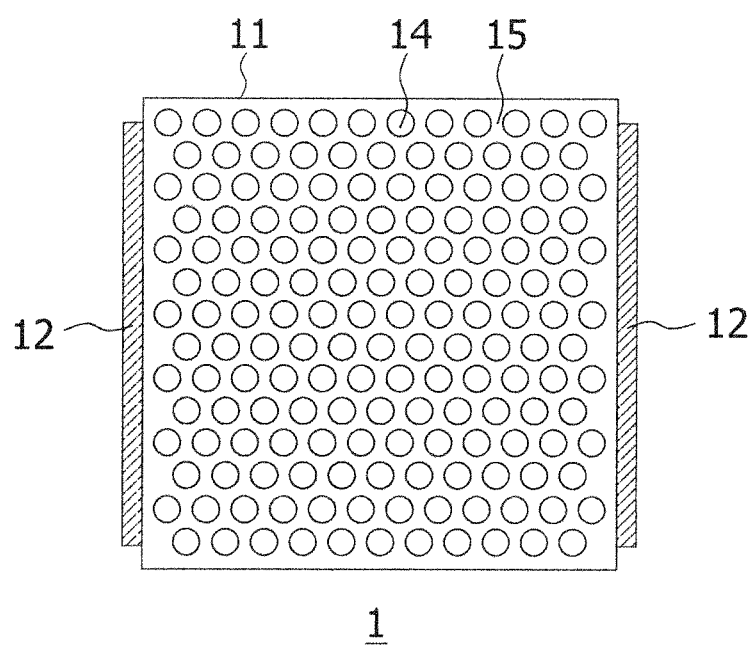
FIG. 2 is a schematic plan view showing a fluid inflow end face of a honeycomb structure forming a reductant injecting device according to Embodiment 1 of the present invention.

When the shape of each cell 14 (the shape of the cross section orthogonal to the extending direction of the cell 14) is circular as shown in FIG. 2, the thickness of the partition wall 15 means a thickness of a portion where "a distance between the cells 14 is the shortest (a portion where the thickness of the partition wall 15 is lower)".

The cells 14 preferably have a density of from 7 to 140 $cells/cm^2$, and more preferably from 15 to 120 $cells/cm^2$. The density of the cells 14 of 7 $cells/cm^2$ or more can allow a sufficient contact area with the aqueous urea solution to be ensured, thereby appropriately controlling the treatment rate of the urea aqueous solution, i.e., the amount of ammonia generated (generation rate). The density of the cells 14 of 140 $cells/cm^2$ or less can reduce the pressure loss, thereby appropriately controlling the treatment rate of the aqueous urea solution, i.e., the amount of ammonia generated (generation rate).

The honeycomb structure portion 11 may have some cells 14 provided with plugged portions at the end portion on the fluid inflow end surface 13a side. The material of the plugged portions is preferably the same as that of the partition wall 15, but other materials may be used.

A shape of the fluid inflow end face 13a may be various shapes such as a rectangle, or other polygons, a circle, and an ellipse in addition to the square shape as shown in FIG. 2. Further, the shape of the fluid inflow end surface 13a is the same as that of the fluid outflow end face 13b, and preferably as the shape of the cross section orthogonal to the extending direction of the cells 14.

The size of the honeycomb structure portion 11 is such that the areas of the fluid inflow end surface 13a and the fluid outflow end surface 13b are from 50 to 10000 $mm^2$, respectively, and more preferably from 100 to 8000 $mm^2$, respectively.

The shape of each cell 14 in the cross section orthogonal to the extending direction of the cell 14 is preferably an ellipse, a quadrangle, a hexagon, an octagon, or a combination thereof, in addition to the circular shape as shown in FIG. 2. Such a shape can reduce the pressure loss when the exhaust gas is passed through the honeycomb structure portion 11, thereby efficiently decomposing the urea in the aqueous urea solution.

Each electrode portion 12 is formed in a band shape along the extending direction of the cells 14, but it may be formed in a wider width extending in the circumferential direction of the honeycomb structure portion 11. Further, in the cross section orthogonal to the extending direction of the cells 14, one electrode portion 12 is arranged on the opposite side of the other electrode portion 12 with the center of the honeycomb structure portion 11 interposed therebetween. Such a configuration can allow any bias of the current flowing in the honeycomb structure portion 11 to be suppressed when the voltage is applied between the pair of electrode portions 12, so that the bias of heat generation in the honeycomb structure portion 11 can be suppressed.

Further, the application of the voltage to the electrode portions 12 preferably heats the honeycomb structure portion 11 such that the temperature of the fluid inflow end surface 13a is 900° C. or less. The temperature of the honeycomb structure portion 11 can be controlled by directly providing a temperature measuring means on the honeycomb structure portion 11. Alternatively, it is also possible to estimate and control the temperature of the honeycomb structure portion 11 from a temperature of the carrier gas, a flow rate of the carrier gas, and the amount of the aqueous urea solution sprayed. Further, if operating conditions of the engine are mapped, the mapping may be replaced with the measurement of the temperature of the carrier gas and the flow rate of the carrier gas.

The material of the electrode portions 12 is preferably the same as the main component of the partition wall 15 of the honeycomb structure portion 11, although not particularly limited thereto.

The electrode portions 12 preferably have an electrical resistivity of from 0.0001 to 100 Ωcm, and more preferably from 0.001 to 50 Ωcm. The electrical resistivity of the electrode portions 12 in such a range can allow the pair of electrode portions 12 to effectively play the role of electrodes in an exhaust gas pipe through which an exhaust gas having elevated temperature flows. The electrical resistivity of the electrode portions 12 is preferably lower than that of the honeycomb structure portion 11.

The electrical resistivity of the electrode portions 12 is a value at 400° C. The electrical resistivity of the electrode portions 12 is a value measured by the four-terminal method.

The pair of electrode portions 12 may be provided with electrode terminal protruding portions 16 for connecting electrical wirings 18 from the outside. The material of the electrode terminal protruding portions 16 may be conductive ceramics or a metal. Further, the material of the electrode terminal protruding portions 16 is preferably the same as that of the electrode portions 12. Further, it is preferable that each electrode terminal protruding portion 16 and a connector 17 of the inner cylinder 2 are connected by the electric wiring 18.

The honeycomb structure portion 11 may be provided with a urea hydrolysis catalyst. By using the urea hydrolysis catalyst, ammonia can be efficiently produced from urea. Examples of the urea hydrolysis catalyst include titanium oxide and the like.

(1-2) Inner Cylinder 2

The inner cylinder 2 is preferably made of stainless steel or the like, although not particularly limited thereto.

In order fit the inner cylinder 2 to the honeycomb structure 1, the inner cylinder 2 preferably has the same type of shape as that of the honeycomb structure portion 11 in the cross section orthogonal to the extending direction of the cells 14. As use herein, "the same type of shape" means that when the shape of the inner cylinder 2 is square, the shape of the honeycomb structure portion 11 is also square, and when the shape of the inner cylinder 2 is rectangular, the shape of the honeycomb structure portion 11 is also rectangular. For example, when the shapes of the inner cylinder 2 and the honeycomb structure portion 11 are of the same type and their shapes are rectangular, it is not necessary for both to have the same ratio of the length to the width.

It is preferable that one end (inlet side end portion) of the inner cylinder 2, at which the urea sprayer 3 is arranged, has a closing surface 24 opposing to the fluid inflow end face 13a of the honeycomb structure portion 11, and is provided with the carrier gas introduction port 22 on the closing surface 24 side. The provision of the carrier gas introduction port 22 on the closing surface 24 side can lead to easy and smooth flow of the carrier gas from the fluid inflow end face 13a side to the fluid outflow end face 13b side, and can prevent a spraying direction of the aqueous urea solution sprayed from the urea sprayer 3 from interfering. Therefore, it is possible to increase the amount of the aqueous urea solution sprayed while improving the effect of suppressing the urea deposits.

Figure 3:
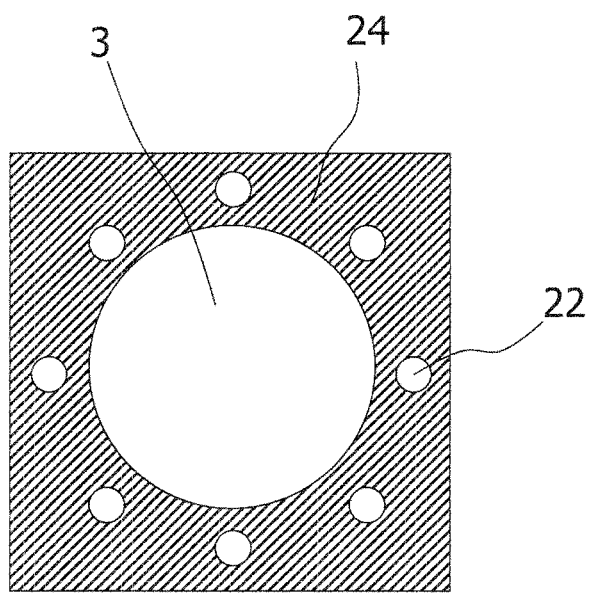
FIG. 3 is a schematic cross-sectional view showing a state of an inner cylinder forming a reductant injecting device according to Embodiment 1 of the present invention on a urea sprayer side.

Further, as shown in FIG. 3, in the cross section between the honeycomb structure portion 11 and the urea sprayer 3, which is orthogonal to a length direction of the inner cylinder 2, a projection plane of the inner cylinder 2 as viewed from the urea sprayer 3 side is preferably such that a plurality of carrier gas introduction ports 22 are concentrically provided around the urea sprayer 3. By thus forming the plurality of carrier gas introduction ports 22, the carrier gas can be introduced in a well-balanced manner on the fluid inflow end face 13a side, so that the aqueous urea solution can be more smoothly fed into the honeycomb structure portion 11.

The shape of each carrier gas introduction port 22 is preferably a circular shape as shown in FIG. 3, but it may be various shapes such as a square, a rectangle, other polygons, and an ellipse.

(1-3) Urea Sprayer 3

The type of the urea sprayer 3 is not particularly limited as long as it can spray the aqueous urea solution. It is preferably a solenoid type, an ultrasonic type, a piezoelectric actuator type, or an atomizer type. By using these, the aqueous urea solution can be easily sprayed in the form of mists. Further, among these, the use of the solenoid type, the ultrasonic type, or the piezoelectric actuator type can allow the aqueous urea solution to be sprayed in the form of mists without using air. This can eliminate necessity of heating the air used for spraying the aqueous urea solution, whereby an amount of energy to be heated can be reduced. Further, since the injection volume is reduced by not using the air used for spraying, a speed at which the aqueous urea solution in the form of mists passes through the honeycomb structure portion 11 can be reduced, resulting in a prolonged reaction time required for decomposition. The size (diameter) of each droplet of the aqueous urea solution sprayed from the urea sprayer 3 is preferably 0.3 mm or less. If the size of the droplet is larger than 0.3 mm, it may be difficult to vaporize it when heated in the honeycomb structure portion 11.

Here, the solenoid type urea sprayer 3 is a device that sprays the aqueous urea solution by vibrating the solenoid or moving a piston back and forth by an electric field using the solenoid. Further, the ultrasonic type urea sprayer 3 is a device that sprays the aqueous urea solution in the form of mists by ultrasonic vibration. Furthermore, the piezoelectric actuator type urea sprayer 3 is a device that sprays the aqueous urea solution in the form of mists by vibration of a piezoelectric element. Moreover, the atomizer type urea sprayer 3 is, for example, a device that sprays the solution by sucking the solution with a pipe and blowing off the solution sucked up to an opening at the tip of the pipe in the form of mists using air. The atomizer type urea sprayer 3 may be a device in which a plurality of small openings are formed at the tip of the nozzle and the solution is sprayed in the form of mists from the openings.

For the urea sprayer 3, the spray direction (the direction where the droplets eject) of the aqueous urea solution is preferably directed to the fluid inflow end surface 13a side of the honeycomb structure portion 11, in order to facilitate the spraying of the aqueous urea solution on the fluid inflow end surface 13a side of the honeycomb structure portion 11.

(1-4) Outer Cylinder 4

The outer cylinder 4 may be made of any material, including, but not particularly limited to, stainless steel and the like.

A shape of the outer cylinder 4 is not particularly limited as long as the outer cylinder 4 can form a flow path through which the carrier gas flows between the inner cylinder 2 and the outer cylinder 4. It is preferable that the shape is of the same type as that of the inner cylinder 2 in the cross section orthogonal to the extending direction of the cells 14.

A length of the outer cylinder 4 is not particularly limited. It is preferably larger than the length of the honeycomb structure portion 11 in terms of ensuring a sufficient flow path for heat exchange with the honeycomb structure portion 11.

Next, the method for producing the reductant injecting device 100 according to the present embodiment will be described in detail.

(2) Method for Producing Reductant Injecting Device 100

(2-1) Production of Honeycomb Structure 1

When the honeycomb structure 1 is made of ceramics, the method for producing the honeycomb structure 1 is preferably as follows:

The method for producing the honeycomb structure 1 includes: a production step of a honeycomb formed body; a production step of a honeycomb dried body; a production step of a honeycomb body with unfired electrodes, and a production step of a honeycomb structure.

(Production Step of Honeycomb Formed Body)

The step of a honeycomb formed body preferably include extruding a forming raw material to produce a honeycomb formed body. The forming raw material preferably contains a ceramic raw material and an organic binder. In addition to the ceramic raw material and the organic binder, the forming raw material may further contain a surfactant, a sintering aid, a pore former, water, and the like. The forming raw material can be obtained by mixing these raw materials.

The ceramic raw material in the forming raw material is "ceramics" or "a raw material that will form ceramics by firing". In any case, the ceramic raw material will form ceramics after firing. The ceramic raw material in the forming raw material preferably contains metallic silicon and silicon carbide particles (silicon carbide powder) as main components, or silicon carbide particles (silicon carbide powder) as a main component. This can provide the resulting honeycomb structure 1 with conductivity. The metallic silicon is also preferably metallic silicon particles (metallic silicon powder). The phrase "contains metallic silicon and silicon carbide particles as main components" means that the total mass of the metallic silicon and silicon carbide particles is 90% by mass or more of the whole (ceramic raw material). Examples of components other than the main components contained in the ceramic raw material include $SiO_2$, $SrCO_3$, $Al_2O_3$, $MgCO_3$, and cordierite.

When the silicon carbide is used as the main component of the ceramic raw material, the silicon carbide is sintered by firing. Further, when the metallic silicon and the silicon carbide particles are used as the main components of the ceramic raw material, the silicon carbide particles as an aggregate are bonded to each other with the metallic silicon as a binder by firing.

When the silicon carbide particles (silicon carbide powder) and the metal silicon particles (metal silicon powder) are used as the ceramic raw materials, the mass of the metal silicon particles is preferably from 10 to 40% by mass, based on the total mass of the silicon carbide particles and the metal silicon particles. The silicon carbide particles preferably have an average particle size of from 10 to 50 μm, and more preferably from 15 to 35 μm. The metallic silicon particles preferably have an average particle size of from 0.1 to 20 μm, and more preferably from 1 to 10 μm. The average particle size of each of the silicon carbide particles and the metal silicon particles is a value measured by a laser diffraction method.

Examples of the organic binder include methyl cellulose, glycerin, and hydroxypropyl methyl cellulose. As the organic binder, one type of organic binder may be used, or a plurality of types of organic binders may be used. An amount of the organic binder blended is preferably from 5 to 10 parts by mass, when the total mass of the ceramic raw materials is 100 parts by mass.

As the surfactant, ethylene glycol, dextrin and the like can be used. As the surfactant, one type of surfactant may be used, or a plurality of types of surfactants may be used. An amount of the surfactant blended is preferably from 0.1 to 2.0 parts by mass, when the total mass of the ceramic raw materials is 100 parts by mass.

The sintering aid that can be used includes $SiO_2$, $SrCO_3$, $Al_2O_3$, $MgCO_3$, cordierite and the like. As the sintering aid, one type of sintering aid may be used, or a plurality of types of sintering aids may be used. An amount of the sintering aid blended is preferably from 0.1 to 3 parts by mass, when the total mass of the ceramic raw materials is 100 parts by mass.

The pore former is not particularly limited as long as it forms pores after firing. Examples include graphite, starch, foamed resins, water-absorbent resins, and silica gel. As the pore former, one type of pore former may be used, or a plurality of types of pore formers may be used. An amount of the pore former blended is preferably from 0.5 to 10 parts by mass, when the total mass of the ceramic raw materials is 100 parts by mass.

An amount of water blended is preferably from 20 to 60 parts by mass, when the total mass of the ceramic raw materials is 100 parts by mass.

When the forming raw material is extruded, first, the forming raw material is kneaded to form a green body. The green body is then extruded to obtain a honeycomb formed product. The honeycomb formed body has porous partition wall 15 that define the cells 14 each extending from the fluid inflow end face 13a to the fluid outflow end face 13b. The partition wall 15 of the honeycomb formed body is a non-dried and non-fired partition wall 15.

(Production Step of Honeycomb Dried Body)

In the step of a honeycomb dried body, first, the resulting honeycomb formed body is dried to prepare a honeycomb dried body. The drying conditions are not particularly limited, and known conditions can be used. For example, it is preferable to dry the honeycomb formed body at a temperature of from 80 to 120° C. for 0.5 to 5 hours.

(Production Step of Honeycomb Body with Unfired Electrodes)

In the production step of a honeycomb body with unfired electrodes, first, an electrode forming slurry containing the ceramic raw material and water is applied to the side surface of the dried honeycomb body. The electrode forming slurry is then dried to form unfired electrodes to produce a honeycomb body with unfired electrodes.

For the honeycomb body with unfired electrodes, the dried honeycomb body is preferably provided with wide rectangular unfired electrodes each extending in a band shape in the extending direction of the cells 14, and also spreading in a circumferential direction. The circumferential direction refers to a direction along the side surface of the dried honeycomb body in the cross section orthogonal to the extending direction of the cells 14.

The electrode forming slurry used in the production step of the honeycomb body with unfired electrodes contains a ceramic raw material and water. The electrode forming slurry may contain a surfactant, a pore former, water, and the like.

As the ceramic raw material, it is preferable to use the ceramic raw material used when producing the honeycomb formed body. For example, when the main components of the ceramic raw material used when producing the honeycomb formed body are the silicon carbide particles and the metallic silicon, the silicon carbide particles and the metallic silicon may also be used as the ceramic raw materials of the electrode forming slurry.

A method of applying the electrode forming slurry to the side surface of the dried honeycomb body is not particularly limited. The electrode forming slurry may be applied, for example, by using a brush or by using a printing technique.

The electrode forming slurry preferably has a viscosity of 500 Pa·s or less, and more preferably from 10 to 200 Pa·s, at 20° C. The viscosity of the electrode forming slurry of 500 Pa·s or less can lead to easy application of the electrode forming slurry to the side surface of the dried honeycomb body.

After applying the electrode forming slurry to the dried honeycomb body, the electrode forming slurry can be dried to obtain unfired electrodes (the honeycomb body with unfired electrodes). The drying temperature is preferably from 80 to 120° C. The drying time is preferably from 0.1 to 5 hours.

(Production Step of Honeycomb Structure)

In the production step of a honeycomb structure, the honeycomb body with the unfired electrodes is fired to produce the honeycomb structure 1.

The firing conditions may be appropriately determined according to the types of the ceramic raw material used in the production of the honeycomb formed body and the ceramic raw material used in the electrode forming slurry.

Further, calcination is preferably carried out after drying the honeycomb molded body with the unfired electrodes and before the firing, in order to remove the binder and the like. The calcination is preferably carried out in an air atmosphere at a temperature of from 400 to 500° C. for 0.5 to 20 hours.

When the urea hydrolysis catalyst is supported on the honeycomb structure 1, for example, the honeycomb structure 1 may be immersed in a container in which a slurry of the urea hydrolysis catalyst is stored. By adjusting a viscosity of the slurry of the urea hydrolysis catalyst, a particle size of the urea hydrolysis catalyst contained, and the like, the catalyst can be supported not only on the surfaces of the partition wall 15 but also in the pores of the partition wall 15, as well as an amount of catalyst to be supported can also be adjusted. Further, the amount of the catalyst to be supported can also be adjusted by sucking the slurry a plurality of times.

(2-2) Production of Reductant Injecting Device 100

The reductant injecting device 100 can be produced by inserting the honeycomb structure 1 into the inner cylinder 2, fixing the honeycomb structure 1 into the inner cylinder 2 via the insulation holding portion 23, and arranging the urea sprayer 3 at one end (inlet side end portion) of the inner cylinder 2, and then connecting each of the connectors 17 of the inner cylinder 2 to each of the electrode terminal protruding portions 16 arranged on the pair of electrode portions 12 via the electric wiring 18, and then inserting the inner cylinder 2 into the outer cylinder 4 and fixing them such that the urea sprayer 3 is located at the outlet side end portion of the outer cylinder 4.

Next, a method of using the reductant injecting device 100 of the present embodiment will be described in detail.

(3) Method of Using Reductant Injecting Device 100

The reductant injecting device 100 according to the present embodiment feeds the aqueous urea solution as a raw material, thereby decomposing the urea in the aqueous urea solution to generate ammonia, and injecting the generated ammonia to the outside. More specifically, the current is conducted through the honeycomb structure portion 11 to increase the temperature (heating), the aqueous urea solution is fed to the urea sprayer 3, and the aqueous urea solution is sprayed from the urea sprayer 3 toward the fluid inflow end face 13a side of the honeycomb structure portion 11. In this case, by introducing the carrier gas previously heated by heat exchange with the honeycomb structure portion 11 heated by current conduction to the fluid inflow end surface 13a side of the honeycomb structure portion 11, the flow of the aqueous urea solution is facilitated to prevent the aqueous urea solution from being stagnated in the honeycomb structure portion 11. The aqueous urea solution sprayed from the urea sprayer 3 is heated by the honeycomb structure portion 11 and evaporated. Due to the increased pressure in the region between the honeycomb structure portion 11 and the urea sprayer 3 caused by the evaporation of the aqueous urea solution, and due to the flow of the carrier gas, the aqueous urea solution sprayed from the urea sprayer 3 enters the cells 14 of the honeycomb structure portion 11 from the fluid inflow end face 13a. The urea in the aqueous urea solution fed into the cells 14 is decomposed by the temperature of the heated honeycomb structure portion 11 to generate the ammonia.

The amount of the aqueous urea solution fed is not particularly limited, and it is preferably be from 1.0 to 2.0 in an equivalent ratio to the amount of nitrogen oxides (NOx) contained in the exhaust gas. If the equivalent ratio is less than 1.0, the amount of nitrogen oxides discharged without purification may increase. However, if the SCR catalyst is provided with a NOx storage function, there may be a period during which the equivalent ratio is less than 1.0. If the equivalent ratio is more than 2.0, there is a risk that the exhaust gas is likely to be discharged with the ammonia mixed in the exhaust gas.

The aqueous urea solution is preferably an aqueous solution containing from 10 to 40% by mass of urea, although not particularly limited thereto. If the urea content is less than 10% by mass, it is necessary to spray a large amount of the aqueous urea solution in order to reduce NOx, and an amount of electric power required for conducting the current to heat the honeycomb structure portion 11 may increase. If the urea content is more than 40% by mass, there is a concern that the urea will solidify in cold regions. Preferable examples of the aqueous urea solution include AdBlue (an aqueous solution containing 32.5% by mass of urea; a registered trademark of Verband der Automobilindustrie (VDA)), which is widely distributed in the market.

The heating temperature of the honeycomb structure portion 11 is preferably 160° C. or higher, and more preferably from 160 to 600° C., and even more preferably from 250 to 400° C. The heating temperature of 160° C. or higher can lead to easy and efficient decomposition of the urea. The heating temperature of 600° C. or lower can allow the ammonia to be burned out and prevent the ammonia from being not fed to the exhaust gas pipe. Further, it is preferable that the heating temperature of the honeycomb structure portion 11 is 360° C. or higher because sulfur compounds such as ammonium hydrogen sulfate and ammonium sulfate precipitated on the reductant injecting device 100 can be removed.

The maximum voltage applied to the honeycomb structure portion 11 is preferably from 12 to 200 V, and more preferably from 12 to 100 V, and even more preferably from 12 to 48 V. The maximum voltage of 12 V or more can allow the temperature of the honeycomb structure portion 11 to be easily increased. The maximum voltage of 200 V or less can prevent a device for increasing the voltage from becoming expensive.

Embodiment 2

Figure 4:
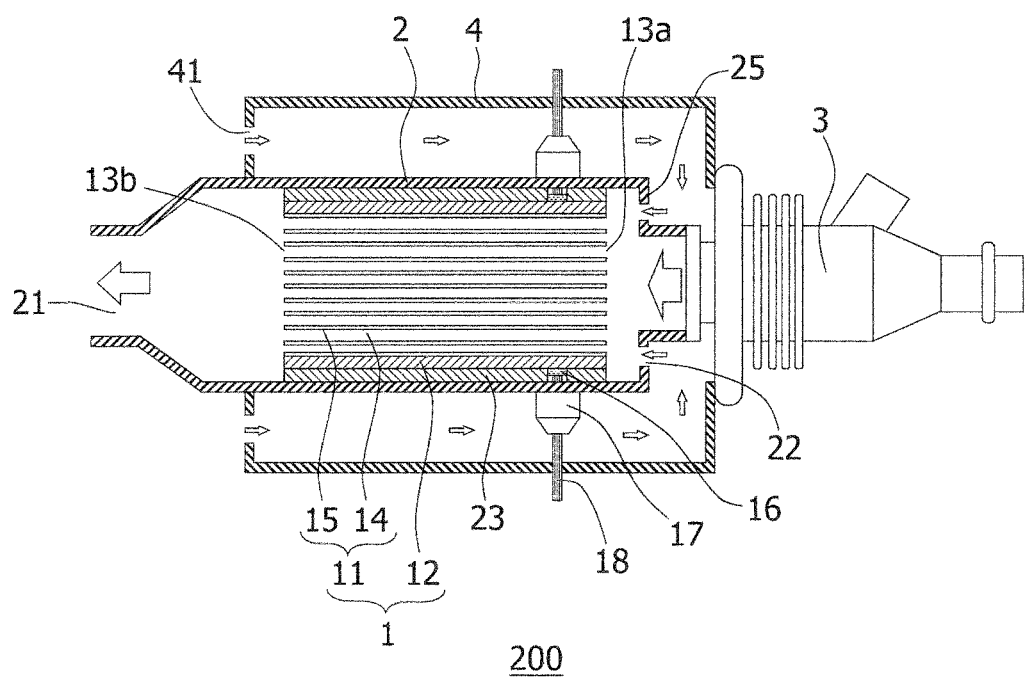
FIG. 4 is a schematic cross-sectional view showing a reductant injecting device according to Embodiment 2 of the present invention.

FIG. 4 is a schematic cross-sectional view showing a reductant injecting device according to Embodiment 2 of the present invention (a schematic cross-sectional view parallel to an extending direction of cells of a honeycomb structure portion).

As shown in FIG. 4, a reductant injecting device 200 according to the present embodiment has a different configuration from that of the reductant injecting device 100 according to Embodiment 1 in that the former has a reduced diameter portion 25 formed in the inner cylinder 2. Other configurations of the reductant injecting device 200 according to the present embodiment are the same as those of the reductant injecting device 100 according to Embodiment 1. Therefore, descriptions of the other configurations will be omitted, and only differences will be described in detail.

In the reductant injecting device 200 according to the present embodiment, the reduced diameter portion 25 of the inner cylinder 2 is located between the honeycomb structure portion 11 and the urea sprayer 3, and the carrier gas introduction port 22 is provided at the reduced diameter portion 25. Such a configuration can allow a degree of freedom of the position for forming the carrier gas introduction port 22 to be increased, so that the carrier gas introduction port 22 can be easily provided regardless of the shape and size of the urea sprayer 3. Further, the provision of the carrier gas introduction port 22 at the reduced diameter portion 25 can lead to easy and smooth flow of the carrier gas from the fluid inflow end face 13a side to the fluid outflow end face 13b side, and can prevent the spraying direction of the aqueous urea solution sprayed from the urea sprayer 3 from interfering. Therefore, it is possible to increase the amount of the aqueous urea solution sprayed while improving the effect of suppressing the urea deposits.

As used herein, the "reduced diameter portion 25" means a portion having a lower diameter, and the portion may be in a stepped shape or a tapered shape.

For the carrier gas introduction port 22 provided in the reduced diameter portion 25, a plurality of carrier gas introduction ports 22 are provided concentrically around the urea sprayer 3 in the cross section orthogonal to the length direction of the inner cylinder 2. By thus forming the plurality of carrier gas introduction ports 22, the carrier gas can be introduced in a well-balanced manner on the fluid inflow end face 13a side, so that the aqueous urea solution can be more smoothly fed into the honeycomb structure portion 11.

Embodiment 3

Figure 5:
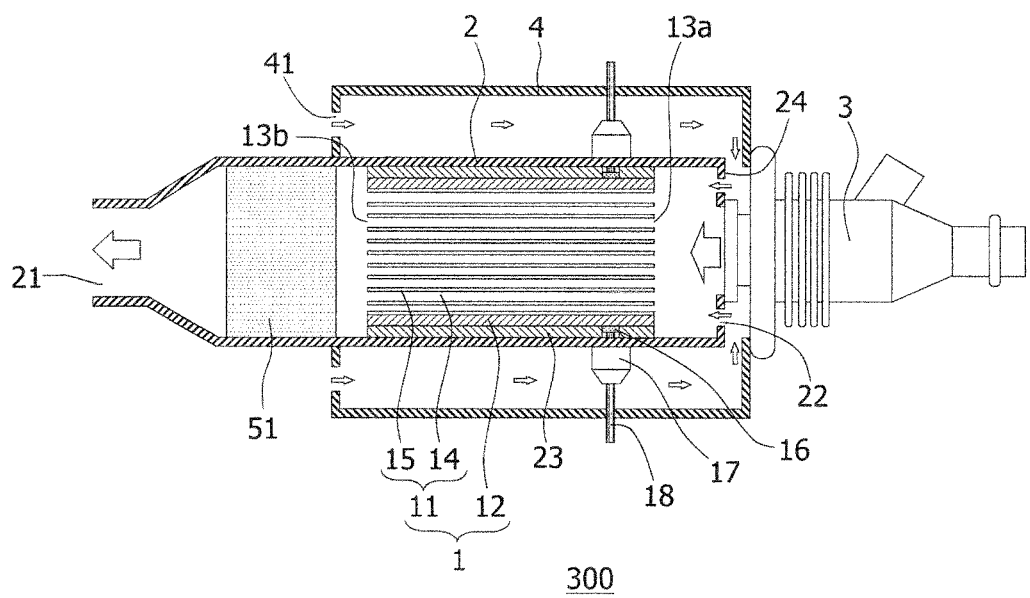
FIG. 5 is a schematic cross-sectional view showing an exhaust gas processing device according to Embodiment 3 of the present invention.

FIG. 5 is a schematic cross-sectional view (a schematic cross-sectional view parallel to the extending direction of the cells of the honeycomb structure portion) showing a reductant injecting device according to Embodiment 3 according to the present invention.

As shown in FIG. 5, a reductant injecting device 300 according to the present embodiment has a different configuration from that of the reductant injecting device 100 in that the former further includes a urea hydrolysis catalyst body 51 arranged on the fluid outflow end face 13b side of the honeycomb structure portion 11, spaced apart from the fluid outflow end face 13b. In addition, other configurations of the reductant injecting device 300 according to the present embodiment are the same as those of the reductant injecting device 100 according to Embodiment 1. Therefore, the descriptions of the other configurations will be omitted, and only the difference will be described in detail.

In the reductant injecting device 300 according to the present embodiment, the urea hydrolysis catalyst body 51 spaced apart from the fluid outflow end face 13b is provided on the fluid outflow end face 13b side of the honeycomb structure portion 11. With such a configuration, unreacted urea in the honeycomb structure portion 11 can be decomposed into ammonia by the urea hydrolysis catalyst body 51, so that the efficiency of ammonia production is improved.

The urea hydrolysis catalyst body 51 is preferably a honeycomb structure on which a urea hydrolysis catalyst is supported. A support (honeycomb structure) used for the urea hydrolysis catalyst body 51 may have the same structure and material as those of the honeycomb structure 1 provided upstream. The honeycomb structure used for the urea hydrolysis catalyst body 51 may not have a pair of electrode portions 12, but it may be configured to be heated by current conduction as in the honeycomb structure 1 provided upstream.

The urea hydrolysis catalyst body 51 may support the urea hydrolysis catalyst on the honeycomb structure after producing the honeycomb structure (support) as in the honeycomb structure 1 provided upstream. The method for supporting the urea hydrolysis catalyst on the honeycomb structure is as described above.

Although the urea hydrolysis catalyst body 51 is added to the reductant injecting device 100 according to Embodiment in FIG. 5, it can also be added to the reductant injecting device 200 according to Embodiment 2.

Embodiment 4

Figure 6:
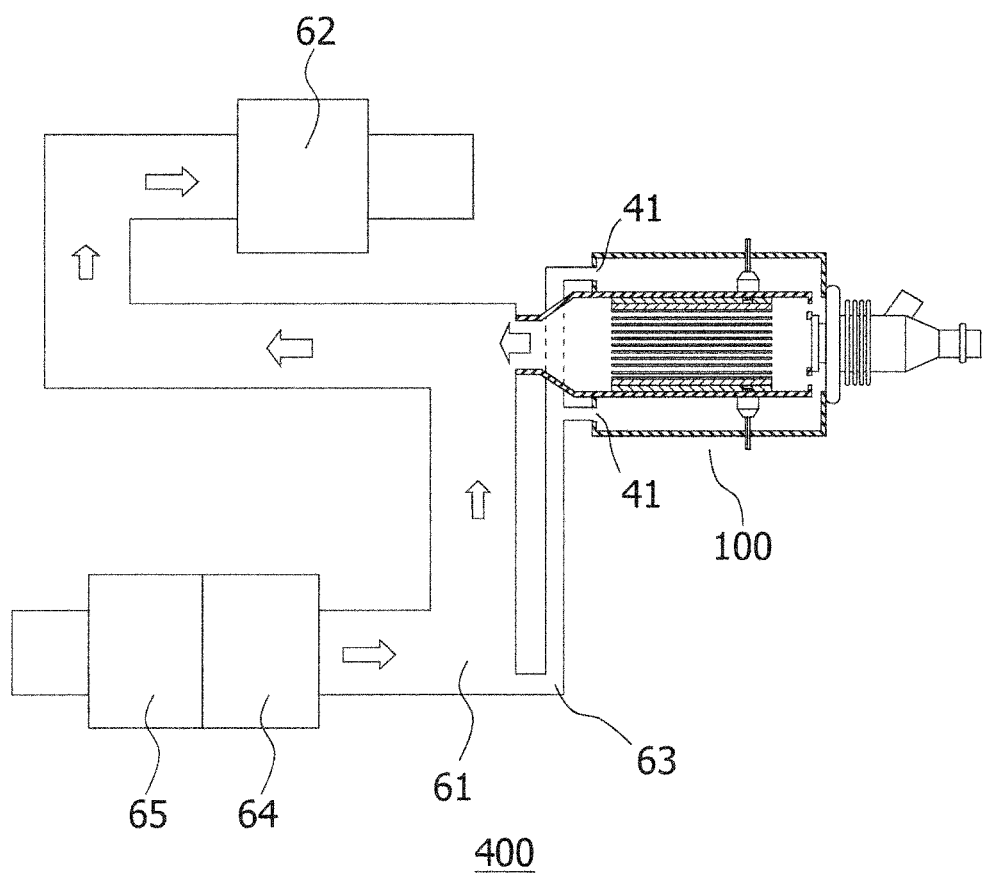
FIG. 6 is a schematic cross-sectional view showing an exhaust gas processing device according to Embodiment 4 of the present invention.
Figure 7:
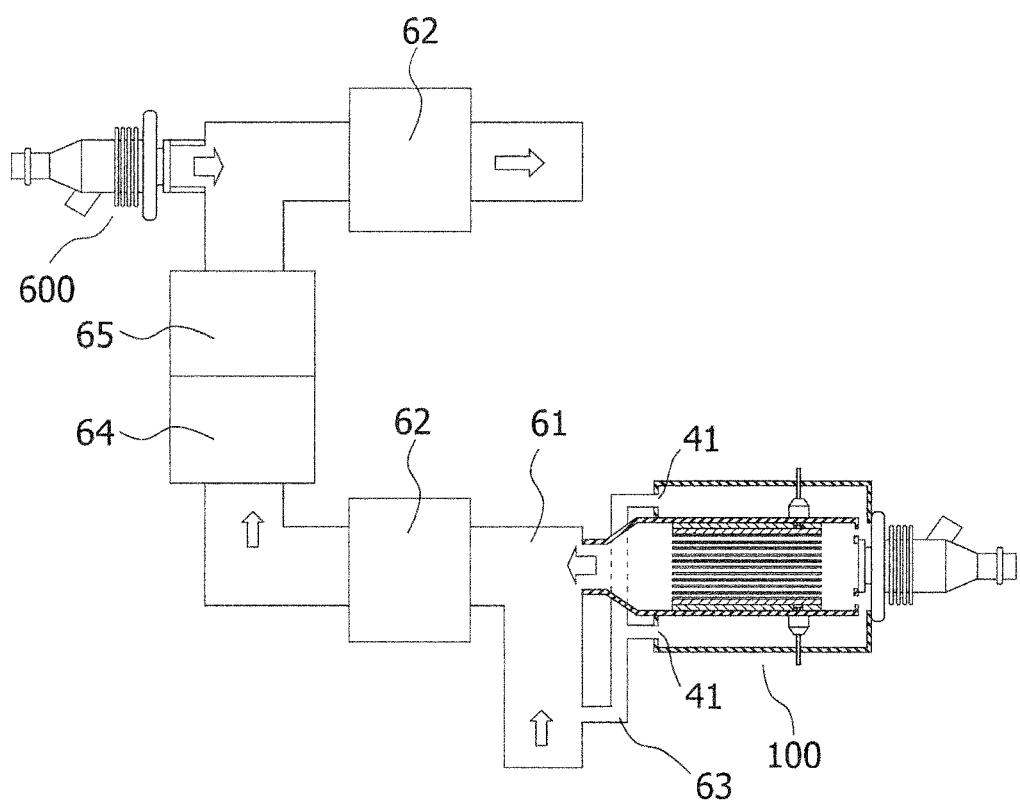
FIG. 7 is a schematic cross-sectional view showing another exhaust gas processing device according to Embodiment 4 of the present invention.

FIGS. 6 and 7 are schematic cross-sectional views showing exhaust gas processing devices according to Embodiment 4 of the present invention.

As shown in FIGS. 6 and 7, each of the exhaust gas processing devices 400, 500 according to the present embodiment include: an exhaust gas pipe 61 through which the exhaust gas flows; the reductant injecting device 100 for injecting the ammonia into the exhaust gas pipe 61; and an SCR catalyst 62 arranged at the exhaust gas pipe 61 on a downstream side of a position where the ammonia is injected.

The exhaust gas pipe 61 is a pipe through which an exhaust gas (an exhaust gas containing NOx) discharged from various engines and the like is passed, and in which the exhaust gas and ammonia are mixed. The size of the exhaust gas pipe 61 is not particularly limited, and it can be appropriately determined depending on exhaust systems such as engines to which the exhaust gas processing devices 400, 500 according the present embodiment are attached. The exhaust gas pipe 61 has a non-limiting length in the gas flow direction, but it preferably has a length in which a distance between the reductant injecting device 100 and the SCR catalyst 62 can be set to an appropriate distance.

A material of the exhaust gas pipe 61 is not particularly limited, but a material that is difficult to be corroded by the exhaust gas is preferable. Examples of the material of the exhaust gas pipe 61 include stainless steel and the like.

The reductant injecting device 100 is attached to the exhaust gas pipe 61, and injects the ammonia into the exhaust gas pipe 61. By injecting the ammonia into the exhaust gas pipe 61 from the reductant injecting device 100, a mixed gas of the ammonia and the exhaust gas is generated in the exhaust gas pipe 61.

As shown in FIG. 6, one reductant injecting device 100 may be attached to the exhaust gas pipe 61. Further, as shown in FIG. 7, two reductant injecting devices may be attached to the exhaust gas pipe 61. In this case, the reductant injecting device on the downstream side may be the reductant injecting device 100 or a conventional reductant injecting device 600 (for example, the urea sprayer 3) that sprays the reductant (urea water) without heating. In a preferred embodiment, the reductant injecting device on the downstream side is the conventional reductant injecting device 600 that sprays the reductant (urea water) without heating. This is because when the amount of NOx in the exhaust gas is lower (when the temperature of the exhaust gas is lower), most of the NOx is purified by the reductant injecting device 100 and the SCR catalyst 62 on the upstream side, and when the amount of NOx in the exhaust gas is higher (when the temperature of the exhaust gas is higher), the urea water sprayed from the conventional reductant injecting device 600 is decomposed into ammonia by the temperature of the exhaust gas. Further, although not shown, three or more reductant injecting devices 100 may be attached to the exhaust gas pipe 61, as needed.

When the exhaust gas is used as the carrier gas to be introduced into the reductant injecting device 100, as shown in FIGS. 6 and 7, the exhaust gas pipe 61 is branched upstream of the reductant injecting device 100, and a branched flow path 63 is connected to a carrier gas introduction port 41. On the other hand, when a carrier gas other than the exhaust gas (for example, an intake gas) is used, the carrier gas introduction port 41 is connected to a carrier gas feed source via a connection pipe or the like.

The SCR catalyst 62 in the form of a catalyst body (the honeycomb structure on which the SCR catalyst 62 is supported) is arranged at the exhaust gas pipe 61 on the downstream of the position where the ammonia is injected. Therefore, as shown in FIG. 6, when one reductant injecting device 100 is attached to the exhaust gas pipe 61, the SCR catalyst 62 is arranged at the exhaust gas pipe 61 on the downstream side of the position where the reductant injecting device 100 is attached. Further, as shown in FIG. 7, when two reductant injecting devices are attached to the exhaust gas pipe 61, the SCR catalysts 62 are arranged at the exhaust gas pipe 61 on the downstream side of the positions where the reductant injecting device 100 and the conventional reductant injecting device 600 are attached, respectively.

Examples of the SCR catalyst 62 include vanadium-based catalysts and zeolite-based catalysts.

When the SCR catalyst 62 is used as a catalyst body supported on the honeycomb structure, it is preferable to contain the catalyst body in a container and attach the container to the exhaust gas pipe 61 on the downstream side.

The honeycomb structure that supports the SCR catalyst 62 is not particularly limited, and honeycomb structures known in the art can be used.

It is preferable that a filter for collecting particulate matters in the exhaust gas is arranged on the upstream side of the exhaust gas pipe 61. Examples of the filter for collecting particulate matters include a ceramic DPF (diesel particulate filter) 64 having a honeycomb shape. Further, it is preferable that an oxidation catalyst 65 for removing hydrocarbons and carbon monoxide in the exhaust gas is arranged on the upstream side of the exhaust gas pipe 61. The oxidation catalyst 65 is preferably in a state of being supported on a honeycomb structure made of ceramics (oxidation catalyst). Preferable examples of the oxidation catalyst 65 that can be used include precious metals such as platinum (Pt), palladium (Pd), and rhodium (Rh).

When one reductant injecting device 100 is attached to the exhaust gas pipe 61, the DPF 64 and the oxidation catalyst 65 are arranged at the exhaust gas pipe 61 on the upstream side of the position where the ammonia is injected by the reductant injecting device 100, as shown in FIG. 6. Further, when two reductant injecting devices 100 are attached to the exhaust gas pipe 61, the DPF 64 and the oxidation catalyst 65 are arranged at the exhaust gas pipe 64 on the upstream side of the position where the ammonia is injected by the conventional reductant injecting device 600, and on the downstream side of the SCR catalyst 62 on the downstream side of the position where the reductant injecting device 100 is attached, as shown in FIG. 7.

It is preferable to dispose an ammonia removing catalyst (oxidation catalyst) for removing ammonia on the downstream side of the SCR catalyst 62. Such a configuration can prevent ammonia from being discharged to the outside when excess ammonia that has not been used for removing NOx in the exhaust gas flows to the downstream side. Preferable examples of the oxidation catalyst arranged on the downstream side of the SCR catalyst 62 include precious metals such as platinum (Pt), palladium (Pd), and rhodium (Rh).

In the above description, the use of the reductant injecting device 100 of Embodiment 1 has been described. However, the reductant injecting devices 200, 300 of Embodiments 2 and 3 may be used.

Embodiment 5

In a method for processing an exhaust gas according to Embodiment 5 of the present invention, the ammonia generated in the reductant injecting devices according to Embodiments 1 to 3 is injected into the exhaust gas, and the exhaust gas mixed with the ammonia is reduced with the SCR catalyst. Thus, the NOx in the exhaust gas can be removed. The method for processing the exhaust gas can be easily carried out by using the exhaust gas processing device 400, 500 according to Embodiment 4.

The reductant injecting devices 100, 200, 300 can feed the carrier gas previously heated by exchanging the heat with the honeycomb structure portion 11 heated by current conduction, to the fluid inflow end face 13a side of the honeycomb structure portion 11, together with the aqueous urea solution sprayed from the urea sprayer 3. In particular, the temperature distribution in the honeycomb structure portion 11 is reduced by feeding the carrier gas to the honeycomb structure portion 11 and bringing about the heat exchange between the honeycomb structure portion 11 having the outer peripheral portion tending to be locally higher and the carrier gas. Therefore, the honeycomb structure portion 11 is difficult to be damaged, and higher power can be supplied to the honeycomb structure 1. Further, the carrier gas can flow through the honeycomb structure portion 11, thereby preventing the urea from remaining in the honeycomb structure portion 11, so that the generation limit of urea deposits can be increased. Further, the ammonia decomposed by heating can be discharged to the outside by the carrier gas, so that the reactiveness is improved. In addition, the carrier gas can be previously heated by heat exchange with the honeycomb structure portion 11, so that a lower electric power supplied to the honeycomb structure 1 can be set. When the amount of urea injected is lower, the electric power may be 0 w.

A temperature and flow rate of the carrier gas and a power supplied to the honeycomb structure 1 are preferably adjusted such that a temperature of the fluid inflow end face 13a of the honeycomb structure portion 11 is 150° C. or higher, and preferably 250° C. or higher. In order to perform such temperature control, for example, the temperature of the carrier gas is preferably 100° C. or higher, and the flow rate is preferably 10 L/min or more. The power supplied to the honeycomb structure 1 is preferably from 150 to 500 W.

An amount of the ammonia injected from the reductant injecting device 100, 200, 300 is preferably from 1.0 to 2.0 in an equivalent ratio to the amount of nitrogen oxide contained in the exhaust gas. If the equivalent ratio is less than 1.0, the amount of nitrogen oxides discharged without purification may increase. If the equivalent ratio is more than 2.0, there is a risk that the exhaust gas is likely to be discharged with the ammonia mixed in the exhaust gas.

It is preferable that the sprayed amount of the aqueous urea solution and the temperature (power supply) of the honeycomb structure portion 11 are controlled by an electronic control unit. Further, the temperature may be calculated from a resistance value of the honeycomb structure portion 11, and the temperature of the honeycomb structure portion 11 may be controlled such that the calculated temperature is a desired temperature.

INDUSTRIAL APPLICABILITY

The reductant injecting device, the exhaust gas processing device, and the method for processing the exhaust gas according to the present invention can be suitably used for purifying NOx in the exhaust gases discharged from various engines and the like.

DESCRIPTION OF REFERENCE NUMERALS 1 honeycomb structure
2 inner cylinder
3 urea sprayer
4 outer cylinder
11 honeycomb structure portion
12 electrode portion
13a fluid inflow end face
13b fluid outflow end face
14 cell
15 partition wall
16 electrode terminal protruding portion
17 connector
18 electrical wiring
21 injection port
22 carrier gas introduction port
23 insulation holding portion
24 closing surface
25 reduced diameter portion
41 carrier gas inflow port
51 urea hydrolysis catalyst body 61 exhaust gas pipe
62 SCR catalyst
63 branched flow path
46 DPF
65 oxidation catalyst
100, 200, 300 reductant injecting device
400, 500 exhaust gas processing device
600 conventional reductant injecting device

The invention claimed is:

1. A reductant injecting device, comprising:
a honeycomb structure comprising a pillar shaped honeycomb structure portion having a partition wall that defines a plurality of cells each extending from a fluid inflow end face to a fluid outflow end face; and at least one pair of electrode portions being configured to heat the honeycomb structure portion by conducting a current, the pair of the electrode portions being formed directly on a side surface of the honeycomb structure portion, the honeycomb structure being configured to decompose urea in an aqueous urea solution in the honeycomb structure portion heated by conducting the current to generate ammonia;
an inner cylinder being configured to house the honeycomb structure, the inner cylinder having a carrier gas introduction port being configured to introduce a carrier gas, on the fluid inflow end face side;
a urea sprayer being configured to spray the aqueous urea solution to the fluid inflow end face of the honeycomb structure portion, the urea sprayer being arranged at one end of the inner cylinder; and
an outer cylinder arranged on an outer peripheral side of the inner cylinder, the outer cylinder being spaced apart from the inner cylinder and having a carrier gas inflow port being configured to allow the carried gas to flow in from the fluid outflow end face side of the honeycomb structure portion,
wherein a flow path through which the carrier gas passes is formed between the inner cylinder and the outer cylinder, and the reductant injecting device is configured to heat the carrier gas through which the flow path passes by heat exchange with the honeycomb structure portion heated by conducting the current; and
wherein one end of the inner cylinder, at which the urea sprayer is arrange, has a closing surface opposing to the fluid inflow end face of the honeycomb structure portion, and the carrier gas introduction port is provided on the closing surface side.

2. The reductant injecting device according to claim 1, wherein the inner cylinder has a reduced diameter portion at a position between the honeycomb structure portion and the urea sprayer, and the carrier gas introduction port is provided at the reduced diameter portion.

3. The reductant injecting device according to claim 1, wherein a plurality of carrier gas introduction ports are concentrically provided around the urea sprayer, in a cross section orthogonal to a length direction of the inner cylinder.

4. The reductant injecting device according to claim 1, wherein the carrier gas introduction port has a circular shape.

5. The reductant injecting device according to claim 1, wherein the carrier gas is an exhaust gas.

6. The reductant injecting device according to claim 1, further comprising a urea hydrolysis catalyst body arranged on the fluid outflow end face side of the honeycomb structure portion, the urea hydrolysis body being separated from the fluid outflow end face.

7. The reductant injecting device according to claim 1, wherein the honeycomb structure portion has an electrical resistivity of from 0.01 to 500 Ωcm.

8. The reductant injecting device according to claim 1, wherein the honeycomb structure portion contains a silicon-silicon carbide composite material or silicon carbide as a main component.

9. The reductant injecting device according to claim 1, wherein the honeycomb structure portion has a surface area per unit volume of from 5 $cm^2/cm^3$ or more.

10. An exhaust gas processing device, comprising:
an exhaust gas pipe through which an exhaust gas flows;
the reductant injecting device according to claim 1, being configured to inject ammonia into the exhaust gas pipe; and
an SCR catalyst arranged at the exhaust cylinder on a downstream side of a position where the ammonia is injected.

11. A method for processing an exhaust gas, the method comprising injecting generated ammonia into the exhaust gas by the reductant injecting device according to claim 1, and reducing the exhaust gas mixed with the ammonia by an SCR catalyst.

* * * * *